United States Patent
Hopson et al.

(10) Patent No.: US 11,434,958 B2
(45) Date of Patent: Sep. 6, 2022

(54) HIGH RETENTION FORCE SERVICEABLE PLUG-ON JOINT ASSEMBLY

(71) Applicant: NEAPCO INTELLECTUAL PROPERTY HOLDINGS, LLC, Farmington Hills, MI (US)

(72) Inventors: Michael Walter Hopson, Clinton Township, MI (US); Arvind Srinivasan, Troy, MI (US); Michael Peter Kinsella, White Lake, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 736 days.

(21) Appl. No.: 15/966,085

(22) Filed: Apr. 30, 2018

(65) Prior Publication Data

US 2018/0320742 A1    Nov. 8, 2018

Related U.S. Application Data

(60) Provisional application No. 62/500,821, filed on May 3, 2017.

(51) Int. Cl.
| *F16D 1/116* | (2006.01) |
| *F16B 21/18* | (2006.01) |
| *F16D 1/10* | (2006.01) |
| *F16D 3/223* | (2011.01) |

(52) U.S. Cl.
CPC .............. *F16D 1/116* (2013.01); *F16B 21/18* (2013.01); *F16B 21/186* (2013.01); *F16D 2001/103* (2013.01); *F16D 2003/22326* (2013.01)

(58) Field of Classification Search
CPC .......... F16D 1/108; F16D 1/112; F16D 1/116; F16D 2001/103; F16D 2003/22326; F16B 21/18; F16B 21/183; F16B 21/186; Y10T 403/7033; Y10T 403/7026; Y10T 403/31; F16J 15/52; F16J 15/525
See application file for complete search history.

(56) References Cited

U.S. PATENT DOCUMENTS

| 3,357,206 | A | * | 12/1967 | Christie | ............... F16D 3/841 |
| | | | | | 464/112 |
| 3,992,117 | A | * | 11/1976 | Ristau | ................. F16D 1/116 |
| | | | | | 403/14 |
| 4,124,318 | A | * | 11/1978 | Sagady | ............... F16B 21/18 |
| | | | | | 403/14 |

(Continued)

FOREIGN PATENT DOCUMENTS

| DE | 10008182 A1 | * | 9/2001 | ........... F16D 3/2237 |
| DE | 10008183 C1 | * | 12/2001 | ............. B60B 27/00 |

(Continued)

*Primary Examiner* — Matthew R McMahon
(74) *Attorney, Agent, or Firm* — Shumaker, Loop & Kendrick, LLP; James D. Miller

(57) ABSTRACT

A joint assembly includes a first member having splines formed therein. A second member includes splines formed thereon and is coupled to the first member. The splines of the first member engage the splines of the second member. An access window is formed on the first member. A ring retains the first member to the second member. A portion of the ring is accessible through the access window, where the ring can be manipulated to release the first member from the second member.

18 Claims, 3 Drawing Sheets

(56) References Cited

U.S. PATENT DOCUMENTS

| | | | | |
|---|---|---|---|---|
| 4,136,982 A | * | 1/1979 | Sagady | F16B 21/18 |
| | | | | 403/108 |
| 4,859,110 A | * | 8/1989 | Dommel | F16B 21/165 |
| | | | | 403/325 |
| 6,251,019 B1 | | 6/2001 | Hofmann et al. | |
| 6,582,151 B2 | * | 6/2003 | Hopson | F16D 1/0894 |
| | | | | 403/359.5 |
| 6,739,422 B2 | * | 5/2004 | Krude | B60B 27/00 |
| | | | | 180/256 |
| 7,722,089 B2 | * | 5/2010 | Nauer | F16L 37/0885 |
| | | | | 285/308 |
| 7,922,590 B2 | | 4/2011 | Pallante | |
| 7,946,374 B2 | * | 5/2011 | Kofuji | F16D 1/10 |
| | | | | 180/226 |
| 8,092,312 B2 | * | 1/2012 | Duncan | F16D 1/116 |
| | | | | 464/134 |
| 8,231,475 B2 | | 7/2012 | Felchner et al. | |
| 8,690,690 B2 | * | 4/2014 | Conger | F16D 1/116 |
| | | | | 464/146 |
| 8,864,591 B2 | * | 10/2014 | Sugiyama | F16C 1/04 |
| | | | | 464/173 |
| 8,870,489 B2 | * | 10/2014 | Langer | F16D 1/108 |
| | | | | 403/359.5 |
| 10,883,545 B2 | * | 1/2021 | Sugiyama | F16D 1/0894 |
| 2009/0233723 A1 | * | 9/2009 | Kofuji | F16D 1/10 |
| | | | | 464/158 |
| 2018/0003240 A1 | * | 1/2018 | Sugiyama | F16D 1/0894 |

FOREIGN PATENT DOCUMENTS

| | | | | |
|---|---|---|---|---|
| EP | 1681477 A1 | * | 7/2006 | F16B 21/18 |
| WO | WO-2016034228 A1 | * | 3/2016 | F16D 1/116 |

* cited by examiner

HIGH RETENTION FORCE SERVICEABLE PLUG-ON JOINT ASSEMBLY

CROSS-REFERENCE TO RELATED APPLICATIONS

This application claims the benefit of U.S. Provisional Application No. 62/500,821, filed on May 3, 2017. The entire disclosure of the above application is incorporated herein by reference.

FIELD

The present technology relates to joint assemblies, particularly to a propeller shaft constant velocity joint with a plug-on interface that provides a high retention force and service access for disassembly thereof.

INTRODUCTION

This section provides background information related to the present disclosure which is not necessarily prior art.

Joint assemblies, including various universal and constant velocity joints, are common components in automotive vehicles for applications requiring a transmission of torque through an angle. Universal joints can be used to join portions of a driveshaft. Constant velocity joints (CV joints or CVJs) are typically used to transmit torque at an angle from a powertrain transmission (transmission or four wheel drive system, for example) of a vehicle to final drive components with a constant velocity or speed.

One type of CV joints are referred to as plug-on CV joints. Plug-on CV joints are used for attachment of a drive or propeller shaft of the vehicle to the powertrain or to the final drive components without requiring the use of threaded fasteners or bolts to secure the joints. Typically, the plug-on CV joint includes an outer joint member and an inner joint member. Internal splines formed on either the inner joint member or the outer joint member couple with external splines formed on the powertrain or a final drive component shaft and secured with an expanding snap ring. The snap ring secures or locks the CV joint axially when corresponding grooves of the internal splines and the external splines are aligned.

Generally, the plug-on CV joints are used for vehicles such as passenger cars and light truck applications having independent suspensions, wherein the drivelines are not subjected to high cyclic axial thrust loading incurred from rapid movement of live beam axles. Disadvantageously, the snap rings used to axially retain or lock the CV joint to the powertrain or final drive components are entirely covered and not easily accessible after assembly. As a result, the snap ring is not easily accessible for disassembly or disengagement with tools during maintenance. To overcome this disadvantage, the snap ring and corresponding grooves are configured to permit forced disassembly with pry tools employing relatively minimal axial loads, generally less than about 500 pounds.

However, these plug-on CV joints with the snap ring are unable to withstand higher thrust loads applied to the driveline on live beam axle applications, while still permitting easy access to the snap ring for maintenance.

It would be desirable to provide a robust plug-on CV joint configured for maximized axial retention of the CV joint to a powertrain or final drive components while maximizing an ease of maintenance thereof.

SUMMARY

The present technology includes articles of manufacture, systems, and processes that relate to a joint assembly, including a robust plug-on CV joint, which is configured for maximized axial retention of the plug-on CV joint to a powertrain or final drive component while maximizing an ease of maintenance thereof. The joint assembly can include a joint having splines formed therein and a shaft having splines formed thereon coupled to the joint, where the splines of the shaft engage the splines of the joint. An access window is formed on the joint and a ring retains the shaft to the joint, where a portion of the ring is accessible through the access window.

In certain embodiments, a joint assembly is provided that includes a first member, a second member, a window, and a retaining means. The first member has a first engagement means and the second member has a second engagement means. A portion of the second member is disposed within the first member, where the second engagement means engages the first engagement means to provide a coupling of the second member to the first member. The window is formed within the first member where the portion of the second member is disposed within the first member. The retaining means is configured to retain the coupling of the second member to the first member, where at least a portion of the retaining means is accessible through the window. A joint, such as a constant velocity joint, can be coupled to one of the first member and the second member.

In certain embodiments, a joint assembly is provided that includes a first member, a second member, a window, and a retaining ring. The first member has an open end and a first plurality of splines formed within the open end. The second member has a second plurality of splines formed thereon. A portion of the second member is disposed within the first member, where the second plurality of splines engages the first plurality of splines to provide a coupling of the second member to the first member. The window is formed within the first member where the portion of the second member is disposed within the first member. The retaining ring is configured to retain the coupling of the second member to the first member and a portion of the retaining ring is accessible through the window. The first member includes an interior surface annular recess that receives a portion of the retaining ring and the second member includes an exterior surface annular recess that receives another portion of the retaining ring.

In certain embodiments, a method of servicing a joint assembly is provided that includes manipulating the retaining means through the window to release the coupling of the second member to the first member. The first member and the second member are then separated by disengaging the second engagement means from the first engagement means. In this way, one of the first member and the second member can be replaced with another of the first member and the second member to form another joint assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
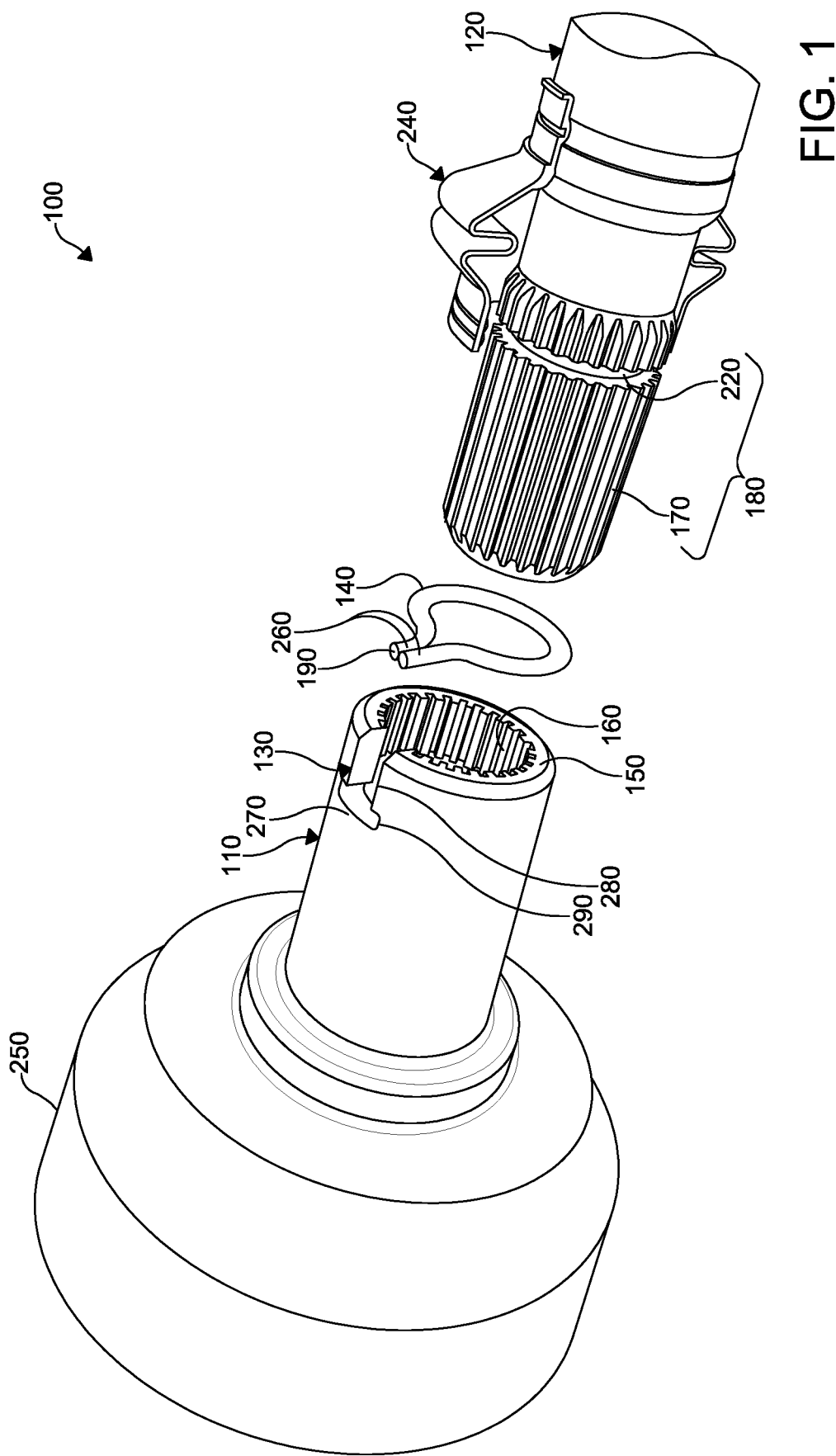
FIG. 1 is an exploded perspective view of an embodiment of a joint assembly according to the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of or" "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

The present technology relates to joint assemblies, including those having various joints or couplings, including universal joints or constant velocity joints and shafts, which can be used in vehicle transmissions and drivelines. Although examples are provided herein with reference to CV joints, the present technology can apply to other types of joint assemblies used in other applications. Joint assemblies according to the present disclosure are configured to facilitate a transmission of rotational forces and torque between components, such as driveline components of a vehicle. Such joint assemblies provide a robust plug-on joint configured for maximized axial retention of the joint to a powertrain or final drive component while maximizing an ease of maintenance thereof.

A joint assembly is provided having a first member with a first engagement means, a second member with a second engagement means, a window formed within the first member, and a retaining means configured to retain the coupling of the second member to the first member. A portion of the second member is disposed within the first member so that the second engagement means engages the first engagement means to provide a coupling of the second member to the first member. The window formed within the first member is located where the portion of the second member is disposed within the first member. A portion of the retaining means is accessible through the window.

Other aspects of the joint assembly include where the first member can include an open end and the first engagement means of the first member can be formed within the open end. In this case, the portion of the second member disposed within the first member can accordingly be disposed within the open end, where the portion of the second member disposed within the first member can also include the second engagement means. The window can be continuous with the open end. That is, the window can provide a pathway from the open end of the first member down a length of a side of the first member. The first engagement means and the second engagement means can be configured to couple the first member and second member in various ways, including various fasteners, keys and keyways, male-female couplings, interlocking features, and so on. In certain embodiments, the first engagement means can include a first plurality of splines and the second engagement can include a second plurality of splines. The first plurality of splines and the second plurality of splines can be complementary, where one can be a set of male splines and the other a set of female splines.

Further aspects of the joint assembly include where the first member has an interior surface recess that receives a portion of the retaining means and the second member has an exterior surface recess that receives another portion of the retaining means. The retaining means can be configured as a retaining ring configured to operate within an interior surface annular recess and an exterior surface annular recess. The joint assembly can include a seal configured to cover the window. In this way, the seal can prevent unwanted material, such as dust or debris, from entering the window. The seal can be moved to uncover the window, allowing access to the retaining means.

The joint assembly can include a joint designed to transmit rotary motion across a static or variable angle. Examples include where a constant velocity joint is coupled to one of the first member and the second member of the joint assembly. In this way, the joint assembly can be configured as a snap-on constant velocity joint. The joint can be configured as a tripod-type or ball-type constant velocity joint. However, it is understood that the joint can be configured as any constant velocity joint or joint assembly of any type having an inner joint member and an outer joint member, as desired. Additional examples of a joint that can be used in the present technology include various universal joints, Cardan joints, double Cardan joints, Tracta joints, Rzeppa joints, Weiss joints, and Thompson couplings. Particular examples of various types of joints further include those described in U.S. Pat. Nos. 6,739,422, 6,251,019, 7,922,590, and 8,231,475. The joint assembly can be configured as part of or coupled to a transfer case, transmission output shaft, axle pinion shaft, drive shaft or propeller shaft. The joint assembly can be configured for use with half-shaft inboard joints or wheel end or outboard joints or any other joints as desired. It is to be understood that the joint assembly can be employed with any rotational members configured for transmitting torque from one component to another component. Additional examples include a vehicle driveline comprising one or more of the joint assemblies provided herein and include a vehicle comprising one or more of the joint assemblies provided herein.

A configuration of joint assemblies according to the present technology optimizes the serviceability thereof. In particular, methods of servicing a joint assembly are provided with respect to the joint assemblies described herein. Such methods include manipulating the retaining means through the window to release the coupling of the second member to the first member. The first member and the second member are then separated by disengaging the second engagement means from the first engagement means. Where the joint assembly further includes a seal configured to cover the window, the method can further comprise uncovering the window from the seal prior to manipulating the retaining means through the window to release the coupling of the second member to the first member. Servicing the joint assembly can also include coupling the separated first member with another second member to form another joint assembly or coupling the separated second member with another first member to form another joint assembly. For example, a damaged member can be easily replaced in this fashion, a different type of joint installed, or the configuration of the joint assembly can be changed by including a member having different dimensions and/or operational properties. The method can also include replacing the retaining means with another retaining means and coupling the separated first member with the separated second member to reform the joint assembly. For example, different retaining means can be swapped in and out that have different retention properties and/or thrust load limits.

The present technology therefore provides a plug-on CV joint with more robust retaining ring locking that can withstand significantly higher thrust loads applied to the driveline on live beam axle applications, while still allowing disassembly for field service repairs. To accomplish this, a more robust retaining ring retention system can provide at least 1,500 lb of retention force to prevent unseating or disassembly during vehicle use on live beam axle driveline applications. The snap ring may be thicker, have sharper corners, or use deeper grooves in the corresponding splined components in order to increase axial retention force.

To maintain the ability to disassemble the CV joint for field service repairs, the retaining ring can contain outward facing tabs and an access window on the internally splined outer race extension to allow access to the tabs for the purpose of unseating the retaining ring for disassembly without the use of heavy prying tools and permanently damaging components.

EXAMPLE

Figure 2:
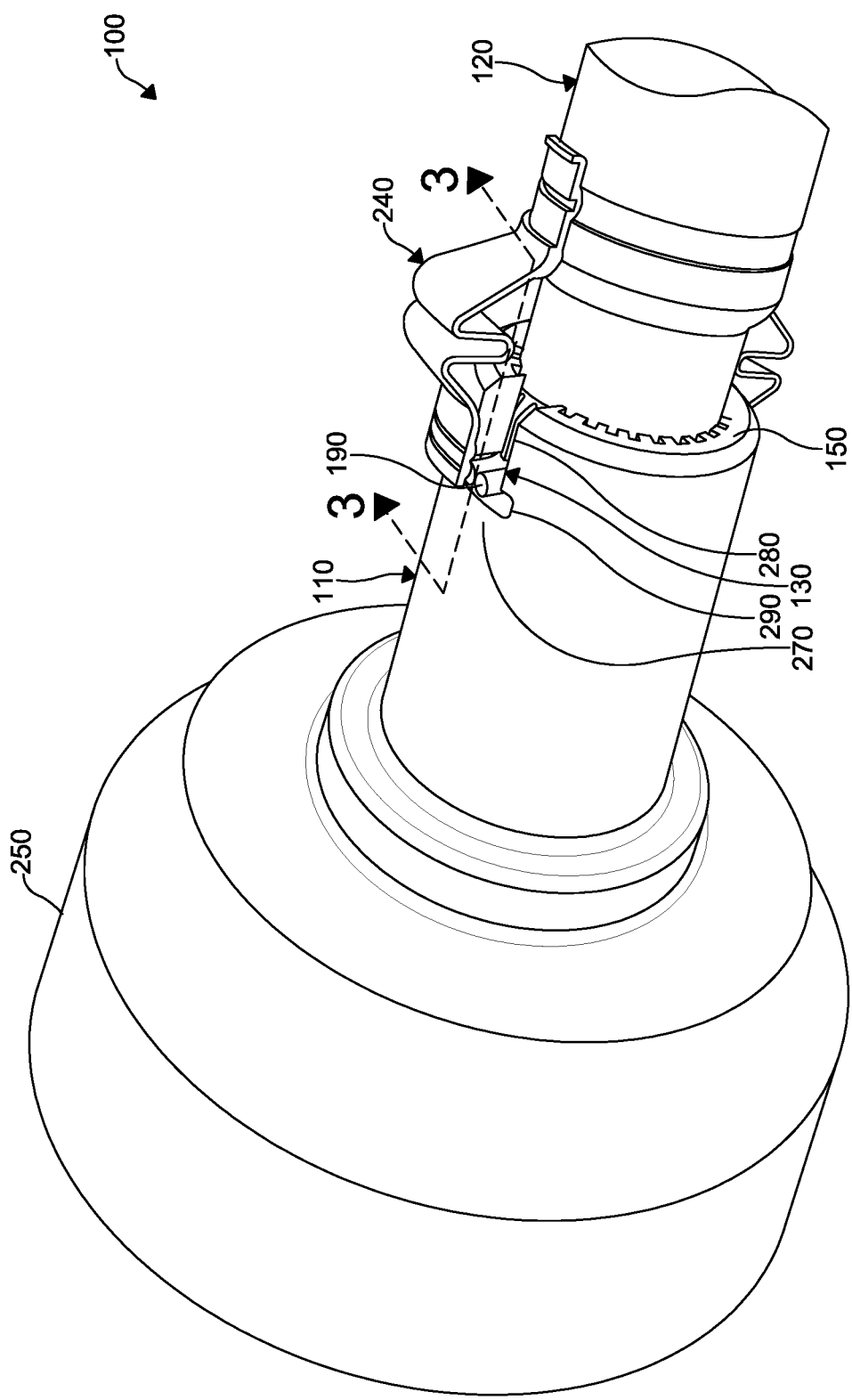
FIG. 2 is an assembled perspective view of the embodiment of the joint assembly of FIG. 1.
Figure 3:
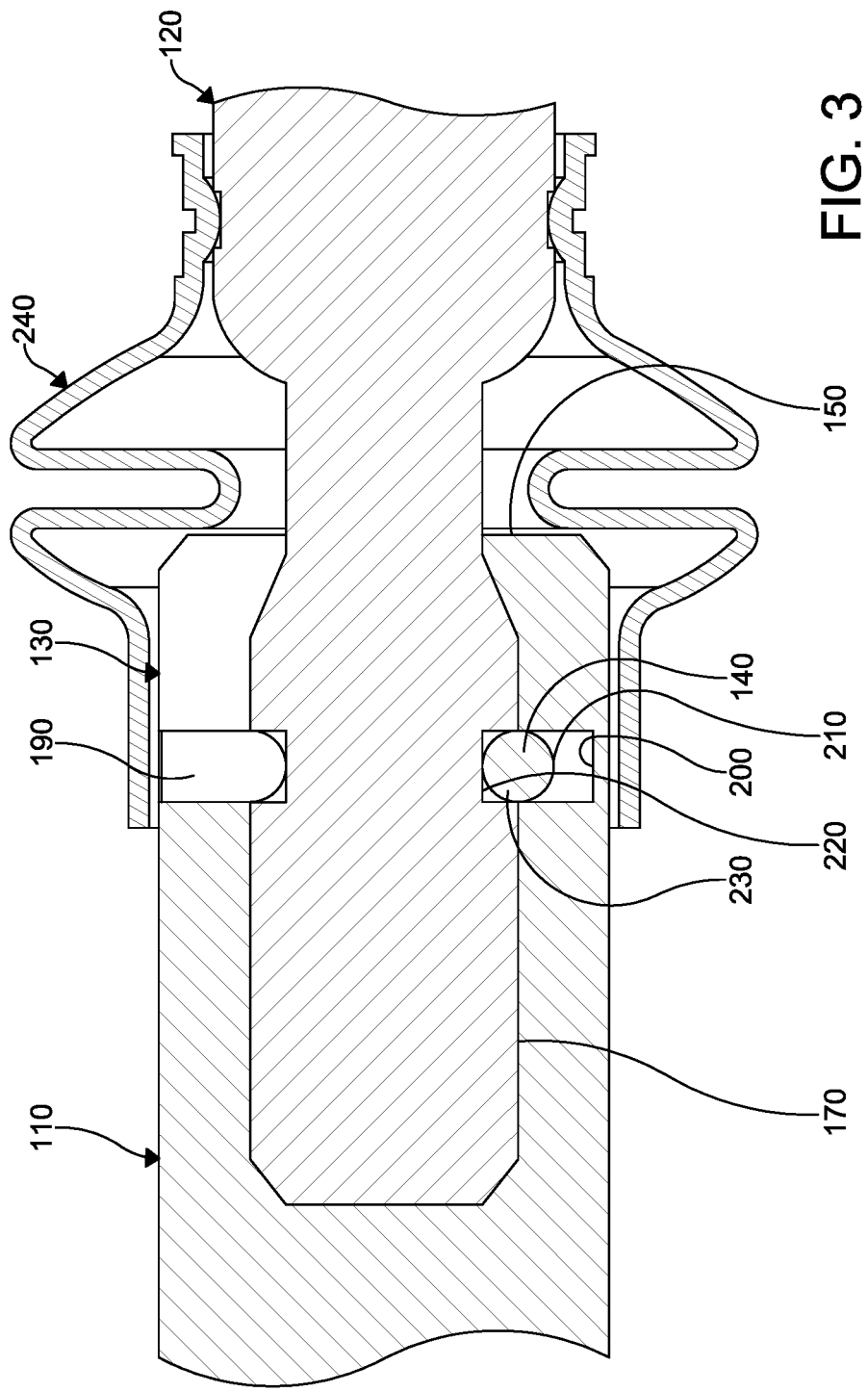
FIG. 3 is a fragmentary cross-sectional view of the joint assembly taken along plane 3-3 in FIG. 2.

With reference now to FIGS. 1-3, an embodiment of a joint assembly according to the present technology is shown at 100.

The joint assembly 100 includes a first member 110, a second member 120, a window 130, and a retaining ring 140. The first member 110 has an open end 150 and a first plurality of splines 160 formed within the open end 150. The second member 120 has a second plurality of splines 170 formed thereon. A portion 180 of the second member 120 is disposed within the open end 150 of the first member 110, where the second plurality of splines 170 engages the first plurality of splines 160 to provide a coupling of the second member 120 to the first member 110. The window 130 is formed within the first member 110 where the portion 180 of the second member 120 is disposed within the first member 110. The retaining ring 140 is configured to retain the coupling of the second member 120 to the first member 110. A portion 190 of the retaining ring 140 is accessible through the window 130. The first member 110 includes an interior surface annular recess 200 that receives a portion 210 of the retaining ring 140 and the second member 120 includes an exterior surface annular recess 220 that receives another portion 230 of the retaining ring 140. The joint assembly 100 includes a seal 240 configured to cover the window 130 when the joint assembly 100 is assembled. As shown, the seal 240 can be coupled to the second member 120 and configured to be slidably disposed over the first member 110. A joint 250, such as a constant velocity joint, is coupled to the first member 110; however, the joint 250 could be coupled to the second member 120. It is also possible to have the joint 250 coupled to one of the first member 110 and the second member 120 and have another joint (not shown) coupled to the other of the first member 110 and the second member 120.

As shown, the first member 110 includes internal splines 160 and the second member 120 includes external splines 170, but other engagement means can be employed to couple the first member 110 and second member 120. The retaining ring 140 is configured as a discontinuous annular expandable snap ring, where ends 260 of the retaining ring 140 form a portion 190 that is accessible through the window 130. The ends 260 can be biased towards or away from each other to permit expansion of the retaining ring 140 within the interior surface annular recess 200 of the first member 110 when the second member 120 is received within the open end 150 of the first member 110 and contraction of the retaining ring 140 when positioned within the exterior surface annular recess 220 of the second member 120.

The window 130 is formed in an outer surface 270 of the first member 110 and receives the portion 190 of the retaining ring 140 that is accessible therethrough. As shown, the window 130 can be T-shaped, where a first portion 280 of the window 130 is continuous with the open end 150 of the first member 110 and a wider second portion 290 extends laterally from the first portion 280 along a circumference of the outer surface 270 of the first member 110. It can be seen that the first portion 280 of the window 130 can have a width that is less than a width of the second portion 290. The ends 260 of the retaining ring 140 extend into the window 130 to permit manipulation thereof, including contraction of the retaining ring 140 to release the coupling of the first member 110 to the second member 120 and permit separation of the first member 110 and the second member 120 by disengaging the second plurality of splines 170 from the first plurality of splines 160.

The seal 240 can be configured as a boot for sealing not only the window 130, but also the interface of the first member 110 with respect to the second member 120. Additional sealing means can be employed (not shown), where the seal 240 can work in conjunction with one or more O-rings or compression devices, such as spring clamps, wire clamps, and ear clamps. More than one seal 240 can be used, as well.

To assemble the joint assembly 100, the retaining ring 140 can be positioned within the open end 150 of the first member 110 at the interior surface annular recess 200, which can be formed on the first plurality of splines 160. To position the retaining ring 140, the portion 190 including the ends 260 is slidingly received through the first portion 280 of the window 130 until the ends 260 are positioned within the wider second portion 290. The second member 120 is received within the open end 150 of the first member 110, where the internal first plurality of splines 160 engages the external second plurality of splines 170. As the second member 120 is received in the open end 150, the second member 120 is consequently received through the retaining ring 140. The retaining ring 140 expands or is expanded as the second member 120 passes therethrough until the retaining ring 140 can contract and engage the exterior surface annular recess 220 formed on the second member 120. The wider second portion 290 of the window 130 permits the ends 260 of the retaining ring 140 to expand as the second member 120 passes therethrough. Once the retaining ring 140 is positioned within the exterior surface annular recess 220 formed on the second member 120, the first member 110 is retained or locked to the second member 120 to militate against an undesired axial displacement of the first member 110 with respect to second member 120. The retaining ring 140 can be configured to accommodate substantial thrust loads while also remaining accessible to manipulation and release thereof. The seal 240 can then be positioned to cover the interface of the first member 110 and the second member 120, including the window 130.

Advantageously, during servicing or maintenance of the joint assembly 100, the window 130 permits easy access to the retaining ring 140, where a tool can be employed to expand the retaining ring 140 for ease of separation of the first member 110 and the second member 120. The joint assembly 100 of the present technology, for example, can facilitate at least 1,500 pounds of retention force to militate against unseating or disassembly of the first member 110 from the second member 120, including where the joint assembly 100 is used in vehicles having live beam axle driveline applications. It is understood that other retention force amounts can be used as desired. The retaining ring 140 configuration of the present technology is more robust than other configurations, while being easily accessible and ergonomically configured for maintenance purposes. The retaining ring 140 can be thicker and/or stronger than other retaining devices or rings known in the art. The retaining ring 140 have also be configured with abrupt or sharp corners formed thereon for enhanced engagement to the interior surface annular recess 200 and/or the exterior surface annular recess 220, which can facilitate maximized retention force. Additionally, the interior surface annular recess 200 and/or the exterior surface annular recess 220 can have a depth greater than other grooves used with retaining rings, which can further facilitate maximized retention force. The retaining ring 140 can have alternate cross-sectional shapes such as circular, square, rectangular, or elliptical, for example, or any other shape as desired, and the interior surface annular recess 200 and/or the exterior surface annular recess 220 can have a corresponding cross-sectional shape. Varying cross-sectional shapes and thicknesses of the retaining ring 140 as well as the cross-sectional shape, sharpness of corners of, and depth of the interior surface annular recess 200 and/or the exterior surface annular recess 220 can be dependent on the retention force required for a desired application.

It is also possible to have the retaining ring 140 pre-installed on the interior surface annular recess 200 formed on the internal first plurality of splines 160 of the first member 110. However, where the second member 120 includes the external second plurality of splines 170, the retaining ring 140 may be preinstalled in the exterior surface annular recess 220 formed on the external splines 170 of the second member 120. Furthermore, the retaining ring 140 can be configured to require spreading the ends 260 apart from each other to disassemble the the first member 110 and second member 120, as shown, or the retaining ring 140 can be configured to require a pinching or closing of the ends 260 with respect to each other to disassemble the first member 110 and second member 120.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A joint assembly comprising:
a first member having a first engagement means and an interior surface recess;
a second member having a second engagement means and an exterior surface recess, a portion of the second member disposed within the first member, the second engagement means engaging the first engagement means to provide a coupling of the second member to the first member;
a window formed within the first member where the portion of the second member is disposed within the first member;
a retaining means configured to retain the coupling of the second member to the first member, wherein distal ends of the retaining means are accessible through the window, wherein the distal ends of the retaining means extend in a direction radially outwardly into the window to a point at or radially inwardly from an outer wall of the first member, and wherein the retaining means is received partially into each of the interior surface recess of the first member and the exterior surface recess of the second member when the retaining means retains the coupling of the second member to the first member; and
a seal configured to cover the window, the seal coupled to the second member adjacent an end of the first member, the seal coupled to the first member adjacent the window, wherein a cylindrical portion of the seal covers the outer wall of the first member along at least a portion of a perimeter of the window, wherein the seal further includes a corrugated portion disposed adjacent the cylindrical portion, and wherein the corrugated portion is spaced radially from each of the first member and the second member.

2. The joint assembly of claim 1, wherein the first member includes an open end and the first engagement means of the first member is formed within the open end.

3. The joint assembly of claim 2, wherein the portion of the second member disposed within the first member is disposed within the open end and includes the second engagement means.

4. The joint assembly of claim 2, wherein the window is continuous with the open end.

5. The joint assembly of claim 1, wherein the first engagement means includes a first plurality of splines and the second engagement means includes a second plurality of splines.

6. The joint assembly of claim 1, wherein the retaining means is configured as a retaining ring.

7. The joint assembly of claim 1, further comprising a constant velocity joint coupled to one of the first member and the second member.

8. The joint assembly of claim 1, wherein the cylindrical portion of the seal is disposed directly radially outwardly of the retaining means when the retaining means retains the coupling of the second member to the first member.

9. The joint assembly of claim 1, wherein the window is continuous with an open end of the first member, and wherein the corrugated portion of the seal is disposed directly radially outwardly of the open end of the first member.

10. The joint assembly of claim 1, wherein the cylindrical portion of the seal is disposed at an end of the seal.

11. A vehicle driveline comprising the joint assembly of claim 1.

12. A vehicle comprising the joint assembly of claim 1.

13. A joint assembly comprising:
a first member having an open end and a first plurality of splines formed within the open end;
a second member having a second plurality of splines formed thereon, a portion of the second member disposed within the first member, the second plurality of splines engaging the first plurality of splines to provide a coupling of the second member to the first member;
a window formed within the first member where the portion of the second member is disposed within the first member;
a retaining ring configured to retain the coupling of the second member to the first member, wherein distal ends of the retaining ring are accessible through the window, the first member including an interior surface annular recess and the second member including an exterior surface annular recess, wherein the retaining ring is received partially into each of the interior surface recess of the first member and the exterior surface recess of the second member when the retaining ring retains the coupling of the second member to the first member, and wherein the distal ends of the retaining ring extend in a direction radially outwardly into the window to a point at or radially inwardly from an outer wall of the first member; and
a seal configured to cover the window, the seal coupled to the second member adjacent the open end of the first member, the seal coupled to the first member adjacent the window, wherein a cylindrical portion of the seal covers the outer wall of the first member along at least a portion of a perimeter of the window, wherein the seal further includes a corrugated portion disposed adjacent the cylindrical portion, and wherein the corrugated portion is spaced radially from each of the first member and the second member.

14. The joint assembly of claim 13, further comprising a constant velocity joint coupled to one of the first member and the second member.

15. A method of servicing a joint assembly comprising:
providing the joint assembly, the joint assembly including;
a first member having a first engagement means and an interior surface recess;
a second member having a second engagement means and an exterior surface recess, a portion of the second member disposed within the first member, the second engagement means engaging the first engagement means to provide a coupling of the second member to the first member;
a window formed within the first member where the portion of the second member is disposed within the first member;
a retaining means configured to retain the coupling of the second member to the first member, wherein distal ends of the retaining means are accessible through the window, wherein the distal ends of the retaining means extend in a direction radially outwardly into the window to a point at or radially inwardly from an outer wall of the first member, and wherein the retaining means is received partially into each of the interior surface recess of the first member and the exterior surface recess of the second member when the retaining means retains the coupling of the second member to the first member; and
a seal configured to cover the window, the seal coupled to the second member adjacent an end of the first member, the seal coupled to the first member adjacent the window, wherein a cylindrical portion of the seal covers the outer wall of the first member along at least a portion of a perimeter of the window, wherein the seal further includes a corrugated portion disposed adjacent the cylindrical portion, and wherein the corrugated portion is spaced radially from each of the first member and the second member;
uncovering the window from the cylindrical portion of the seal to provide access to the distal ends of the retaining means,
manipulating the distal ends of the retaining means through the window to release the coupling of the second member to the first member; and
separating the first member and the second member by disengaging the second engagement means from the first engagement means.

16. The method of servicing the joint assembly of claim 15, wherein the joint assembly further comprises a constant velocity joint coupled to one of the first member and the second member.

17. The method of servicing the joint assembly of claim 15, further comprising coupling the separated first member with another second member to form another joint assembly.

18. The method of servicing the joint assembly of claim 15, further comprising coupling the separated second member with another first member to form another joint assembly.

* * * * *